(12) United States Patent
Bouchard et al.

(10) Patent No.: US 7,895,431 B2
(45) Date of Patent: Feb. 22, 2011

(54) PACKET QUEUING, SCHEDULING AND ORDERING

(75) Inventors: Gregg A. Bouchard, Round Rock, TX (US); Thomas F. Hummel, Marlborough, MA (US); Richard E. Kessler, Shrewsbury, MA (US); Muhammed R. Hussain, Pleasanton, CA (US); Yen Lee, San Jose, CA (US)

(73) Assignee: Cavium Networks, Inc., Mountain View, CA (US)

( * ) Notice: Subject to any disclaimer, the term of this patent is extended or adjusted under 35 U.S.C. 154(b) by 1243 days.

(21) Appl. No.: 11/005,490

(22) Filed: Dec. 6, 2004

(65) Prior Publication Data

US 2006/0056406 A1    Mar. 16, 2006

Related U.S. Application Data

(60) Provisional application No. 60/609,211, filed on Sep. 10, 2004.

(51) Int. Cl.
 H04L 29/06    (2006.01)
 H04L 12/28    (2006.01)
 G06F 15/167   (2006.01)
(52) U.S. Cl. ............... 713/152; 370/395.4; 709/213
(58) Field of Classification Search ............ 370/410, 370/412, 413, 350, 392, 395.4, 395.42, 419, 370/420, 451, 503, 507; 726/14, 15, 23; 709/248, 213, 224; 713/151, 152, 153, 189
See application file for complete search history.

(56) References Cited

U.S. PATENT DOCUMENTS

| 5,325,493 A | * | 6/1994 | Herrell et al. ............ 712/201 |
| 5,471,593 A | | 11/1995 | Branigin et al. | |
| 6,591,302 B2 | | 7/2003 | Boucher et al. | |
| 6,687,833 B1 | | 2/2004 | Osborne et al. | |
| 6,701,437 B1 | * | 3/2004 | Hoke et al. ............ 726/15 |

(Continued)

FOREIGN PATENT DOCUMENTS

WO    WO03/088072    10/2003

(Continued)

OTHER PUBLICATIONS

Kent, S. and Atkinson, R., Security Architecture for the Internet Protocol [online], Nov. 1998 [retrieved on Aug. 31, 2004]. Retrieved from the Internet <URL:http://www.ietf.org/rfc/rfc2401.txt>.

(Continued)

*Primary Examiner*—Hanh Nguyen
(74) *Attorney, Agent, or Firm*—Hamilton, Brook, Smith & Reynolds, P.C.

(57) ABSTRACT

A method and apparatus for ordering, synchronizing and scheduling work in a multi-core network services processor is provided. Each piece of work is identified by a tag that indicates how the work is to be synchronized and ordered. Throughput is increased by processing work having different tags in parallel on different processor cores. Packet processing can be broken up into different phases, each phase having a different tag dependent on ordering and synchronization constraints for the phase. A tag switch operation initiated by a core switches a tag dependent on the phase. A dedicated tag switch bus minimizes latency for the tag switch operation.

31 Claims, 9 Drawing Sheets

U.S. PATENT DOCUMENTS

| | | | |
|---|---|---|---|
| 6,708,218 B1 | 3/2004 | Ellington et al. | |
| 6,799,314 B2 * | 9/2004 | Beniyama et al. | 717/100 |
| 6,975,647 B2 | 12/2005 | Neale et al. | |
| 6,983,366 B1 * | 1/2006 | Huynh et al. | 713/168 |
| 7,007,106 B1 * | 2/2006 | Flood et al. | 709/248 |
| 7,051,330 B1 * | 5/2006 | Kaler et al. | 718/106 |
| 7,127,534 B2 | 10/2006 | Jackson et al. | |
| 7,181,544 B2 | 2/2007 | Vangal et al. | |
| 7,190,699 B2 | 3/2007 | Lambrecht | |
| 7,191,321 B2 * | 3/2007 | Bernstein et al. | 712/245 |
| 7,274,706 B1 | 9/2007 | Nguyen et al. | |
| 7,337,314 B2 * | 2/2008 | Hussain et al. | 713/151 |
| 7,366,101 B1 | 4/2008 | Varier et al. | |
| 7,376,755 B2 | 5/2008 | Pandya | |
| 7,415,723 B2 * | 8/2008 | Pandya | 726/13 |
| 7,424,019 B1 | 9/2008 | Kopelman et al. | |
| 7,443,836 B2 * | 10/2008 | Hooper et al. | 370/352 |
| 7,535,907 B2 | 5/2009 | Hussain et al. | |
| 7,590,785 B2 * | 9/2009 | Joffe et al. | 710/240 |
| 2002/0133593 A1 | 9/2002 | Johnson et al. | |
| 2003/0065812 A1 | 4/2003 | Beier et al. | |
| 2004/0010612 A1 | 1/2004 | Pandya | |
| 2004/0054813 A1 | 3/2004 | Boucher et al. | |
| 2004/0143655 A1 | 7/2004 | Narad et al. | |
| 2004/0205332 A1 | 10/2004 | Bouchard et al. | |
| 2004/0205336 A1 | 10/2004 | Kessler et al. | |
| 2004/0218623 A1 | 11/2004 | Goldenberg et al. | |
| 2005/0165985 A1 | 7/2005 | Vangal et al. | |
| 2005/0188102 A1 | 8/2005 | Madajczak | |
| 2006/0072563 A1 | 4/2006 | Regnier et al. | |
| 2006/0133377 A1 | 6/2006 | Jain | |
| 2006/0227811 A1 | 10/2006 | Hussain et al. | |

FOREIGN PATENT DOCUMENTS

WO    WO 2006/031459 A1    3/2006

OTHER PUBLICATIONS

Feb. 13, 2006, Notification of Transmittal of the International Search Report (ISR) and the Written Opinion (WO) of the International Searching Authority, or the Declaration, ISR and WO, PCT/US2005/031219.

Mar. 22, 2007, Notification Concerning Transmittal of International Preliminary Report on Patentability (IPER) & IPER and Written Opinion, PCT/US2005/031219.

* cited by examiner

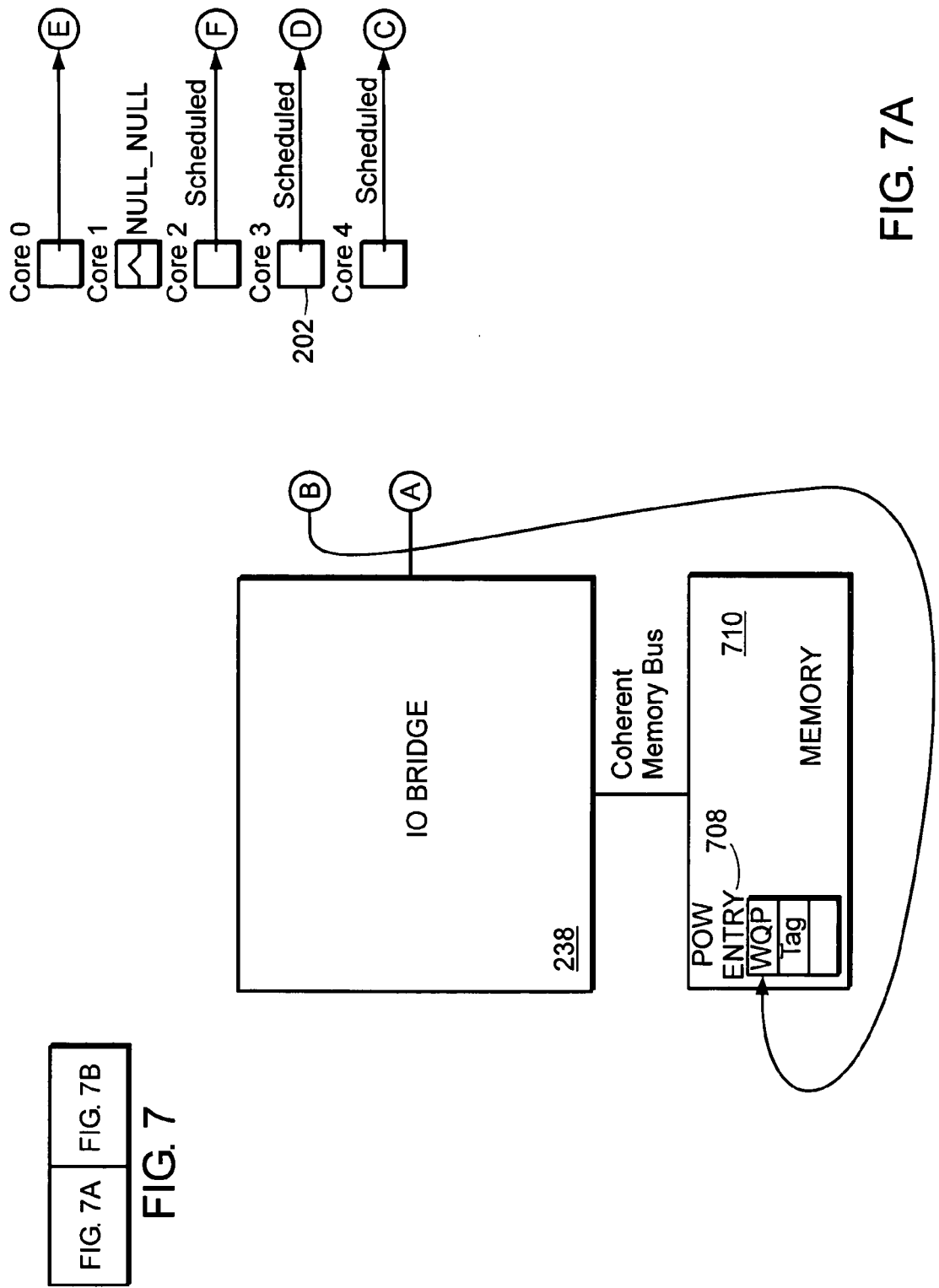

PACKET QUEUING, SCHEDULING AND ORDERING

RELATED APPLICATION

This application claims the benefit of U.S. Provisional Application No. 60/609,211, filed on Sep. 10, 2004. The entire teachings of the above application are incorporated herein by reference.

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L2-L7 network protocols that require more intelligent processing. For example, the Transmission Control Protocol (TCP), an L4 network protocol, requires several compute intensive tasks including computing a checksum over the entire payload in the packet, managing TCP segment buffers, and maintaining multiple timers at all times on a per connection basis. Although a general purpose processor can perform the compute intensive tasks, it does not provide sufficient performance to process the data so that it can be forwarded at wire-speed.

SUMMARY OF THE INVENTION

A network services processor includes a packet work order module that schedules and queues work (packet processing operations) for L4-L7 network protocols to be performed by one or more core processors. The work to be scheduled is queued in an input queue that appears infinite by allowing the input queue to expand into external memory so that work can be added to the input queue even when no new work can be scheduled by the packet work order module. Thus, queuing of new work does not stall while the packet work order unit is busy. The work is queued in order in external memory until it can be moved into the packet work order module for processing.

The packet processing (work) to be performed on a particular packet includes a plurality of packet processing operations (pieces of work). Each piece of work has an associated tag. The tag allows work to be scheduled such that the work can be performed in parallel by a plurality of processors while ensuring that execution of the work is ordered and synchronized. The scheduling and queuing of the packet processing operations allows data to be processed, so that it can be forwarded at wire-speed; that is, at the data transfer rate of the network.

A system and method for queuing and scheduling processing of packets increases packet processing throughput in the network services processor according to the principles of the present invention. A network services processor includes a plurality of independent processors and a work order module. Each processor operates in parallel to perform work. The work order module dynamically schedules work to be performed in parallel by the processors based on a tag associated with the work such that execution of the work is ordered and synchronized.

The work order module includes an input queue that stores work to be executed by the processors and a plurality of in-flight lists. Work in the input queue can be stored in the work order module or in memory external to the work order module so that the work queue appears infinite. By allowing the work queue to appear infinite, work can be queued in external memory and later moved into the packet work order module prior to scheduling the work for processing. The work may include, for example, IPSec encryption, IPSec decryption, defragmentation of a Virtual Private network packet or adjusting TCP sequence numbers. At least one of the processors may perform control plane processing and another one of the processors may perform data plane processing.

Each in-flight list is associated with a different tag for tracking in-flight work associated with the tag. Work queued in the input queue is scheduled by a work order module. The work is scheduled by moving the work from the input queue to an in-flight list. The in-flight list is selected dependent on the tag associated with the work.

The work order module may also include a group identifier per processor. The group identifier indicates groups for which a processor will accept work and differentiates work on the input queue by groups, such that work is scheduled to a processor that accepts work from the group.

The network services processor may also include a timer for controlling when work is added to the input queue. The tag may include a tag type. One in-flight list may store work having an atomic tag type with only work at the head of the list being executable by one of the plurality of processors. Another in-flight list may store work having an ordered tag type, with all work on the list being executable, and work being removable only from the head of the list by one of the plurality of processors.

To minimize latency for a tag switch operation, that is, an operation that modifies the tag associated with work, a dedicated tag switch bus may be coupled between the processors and the work order module for transmitting an indication of the completion of a tag switch operation by the packet work order unit. The core initiates a tag switch operation by executing a store instruction, the packet work order unit modifies the tag and moves the work to an in-flight queue associated with the modified tag. Each input queue may have an assigned priority and/or be assigned for storing a particular type of work.

The ability to define how each packet processing operation is to be performed allows processing of upper protocol layers in received packets to be performed to forward packets at wire-speed. In addition, the ability to expand the input queues into external memory allows in-order queuing of work while the network services processor is busy handling other work.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
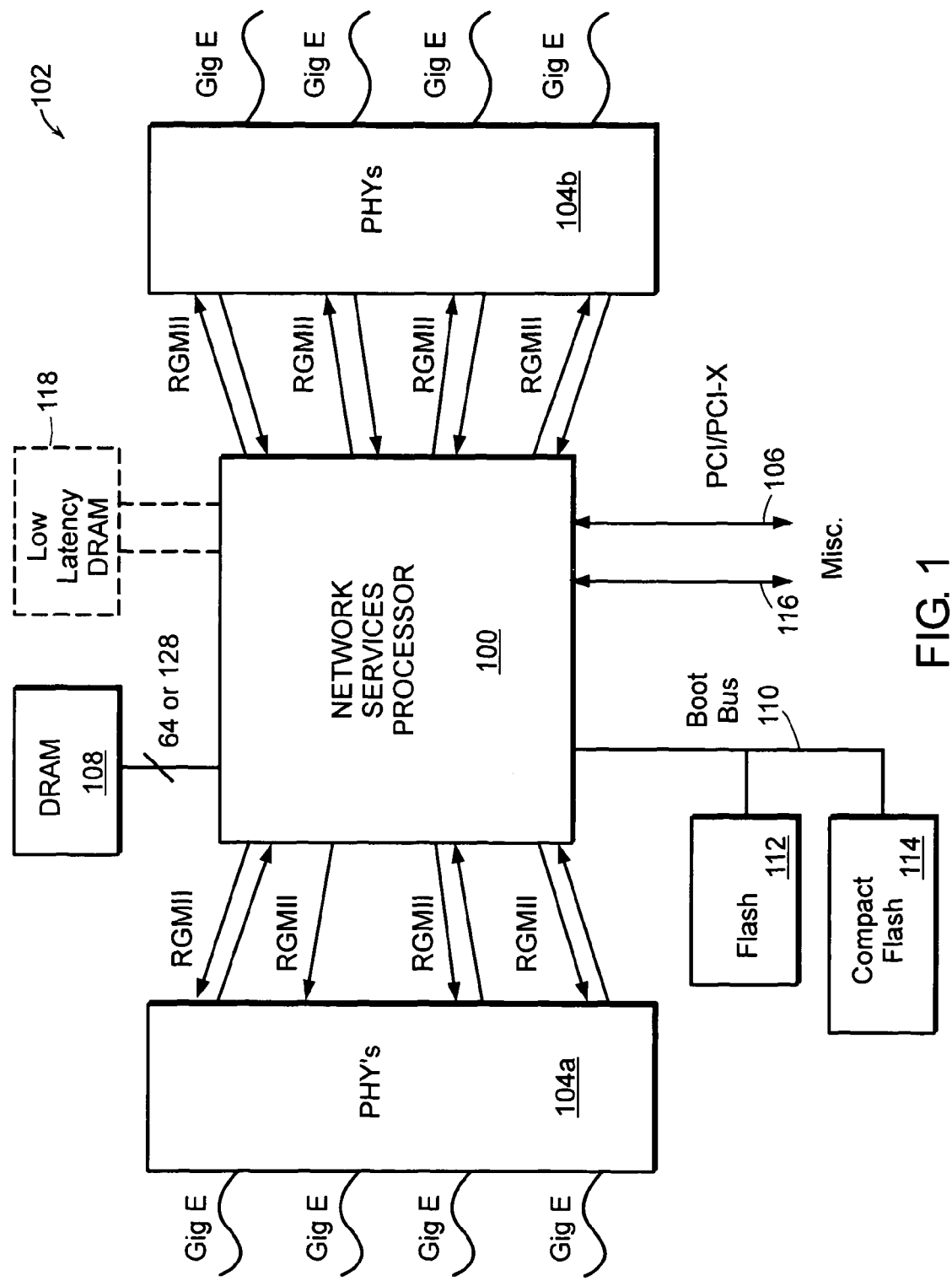
FIG. 1 is a block diagram of a security appliance including a network services processor according to the principles of the present invention.

FIG. 1 is a block diagram of a security appliance 102 including a network services processor 100 according to the principles of the present invention. The security appliance 102 is a standalone system that can switch packets received at one Ethernet port (Gig E) to another Ethernet port (Gig E) and perform a plurality of security functions on received packets prior to forwarding the packets. For example, the security appliance 102 can be used to perform security processing on packets received on a Wide Area Network prior to forwarding the processed packets to a Local Area Network. The network services processor 100 includes hardware packet processing, buffering, work scheduling, ordering, synchronization, and coherence support to accelerate packet processing tasks according to the principles of the present invention.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor schedules and queues work (packet processing operations) for upper level network protocols, for example, L4-L7. The packet processing (work) to be performed on a particular packet includes a plurality of packet processing operations (pieces of work). Each piece of work has an associated tag. The tag allows work to be scheduled in parallel by a plurality of processor cores in the network services processor while ensuring that execution of the work is ordered and synchronized. The queuing and scheduling of the work allows processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 includes a plurality of Ethernet Media Access Control interfaces with standard Reduced Gigabyte Media Independent Interface (RGMII) connections to the off-chip PHYs 104a, 104b.

The network services processor 100 receives packets from the Ethernet ports (Gig E) through the physical interfaces PHY 104a, 104b, performs L7-L2 network protocol processing on the received packets and forwards processed packets through the physical interfaces 104a, 104b to another hop in the network or the final destination or through the PCI bus 106 for further processing by a host processor. The network protocol processing can include processing of network security protocols such as Firewall, Application Firewall, Virtual Private Network (VPN) including IP Security (IPSec) and/or Secure Sockets Layer (SSL), Intrusion detection System (IDS) and Anti-virus (AV).

A DRAM controller in the network services processor 100 controls access to an external Dynamic Random Access Memory (DRAM) 108 that is coupled to the network services processor 100. The DRAM 108 stores data packets received from the PHYs interfaces 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz.

A boot bus 110 provides the necessary boot code which is stored in flash memory 112 and is executed by the network services processor 100 when the network services processor 100 is powered-on or reset. Application code can also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Interface (MDIO), Universal Asynchronous Receiver-Transmitters (UARTs) and serial interfaces.

The network services processor 100 includes another memory controller for controlling Low latency DRAM 118. The low latency DRAM 118 is used for Internet Services and Security applications allowing fast lookups, including the string-matching that may be required for Intrusion Detection System (IDS) or Anti Virus (AV) applications.

Figure 2:
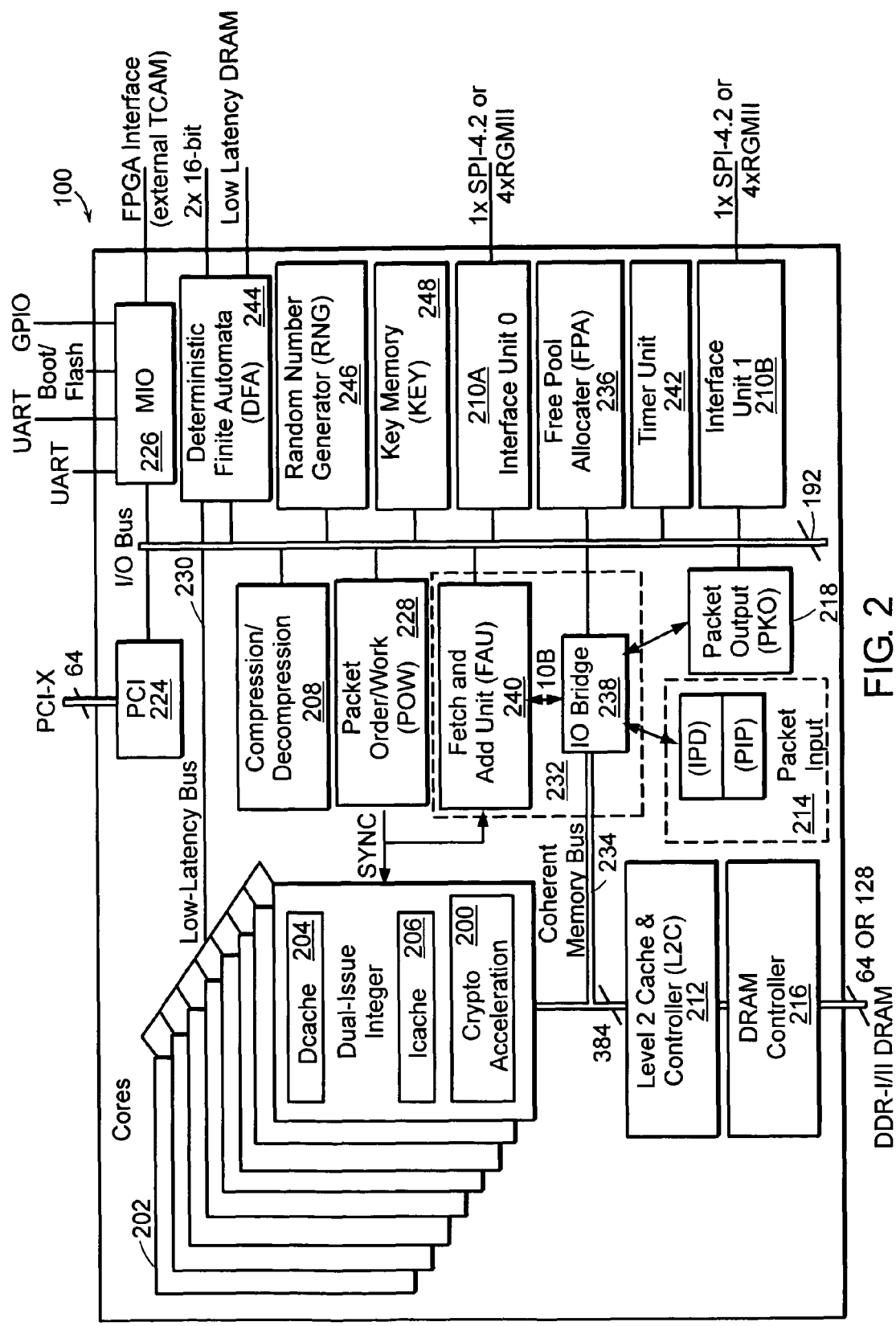
FIG. 2 is a block diagram of the network services processor shown in FIG. 1.

FIG. 2 is a block diagram of the network services processor 100 shown in FIG. 1. The network services processor 100 delivers high application performance using a plurality of processor cores 202. Network applications can be categorized into data plane and control plane operations. Each of the cores 202 can be dedicated to performing data plane or control plane operations. A data plane operation includes packet operations for forwarding packets. A control plane operation includes processing of portions of complex higher level protocols such as Internet Protocol Security (IPSec), Transmission Control Protocol (TCP) and Secure Sockets Layer (SSL). A data plane operation can include processing of other portions of these complex higher level protocols.

The packet input unit 214 allocates and creates a work queue entry for each packet. This work queue entry contains a pointer to the buffered packet stored in L2 cache 212 or DRAM 108 (FIG. 1). The work queue entry will be described later in conjunction with FIG. 4.

Packet Input/Output processing is performed by an interface unit 210a, 210b, a packet input unit (Packet Input) 214 and a packet output unit (PKO) 218. The input controller and interface units 210a, 210b perform all parsing of received packets and checking of results to offload the cores 202.

A packet is received by any one of the interface units 210a, 210b through a SPI-4.2 or RGM II interface. A packet can also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 performs pre-processing of L3 and L4 network protocol headers included in the received packet. The pre-processing includes checksum checks for Transmission Control Protocol (TCP)/User Datagram Protocol (UDP) (L3 network protocols).

The packet input unit 214 writes packet data into buffers in Level 2 cache 212 or DRAM 108 in a format that is convenient to higher-layer software executed in at least one processor core 202 for further processing of higher level network protocols. The packet input unit 214 supports a programmable buffer size and can distribute packet data across multiple buffers to support large packet input sizes.

The Packet order/work (POW) module (unit) 228 queues and schedules work (packet processing operations) for the processor cores 202. Work is defined to be any task to be performed by a core that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a core on the received packet stored in memory. For example, the work can be the processing of a received Firewall/Virtual Private Network (VPN) packet. The processing of a Firewall/VPN packet includes the following separate packet processing operations (pieces of work): (1) defragmentation to reorder fragments in the received packet; (2) IPSec decryption (3) IPSec encryption; and (4) Network Address Translation (NAT) or TCP sequence number adjustment prior to forwarding the packet.

As some packet processing operations require ordering and other packet processing operations require both ordering and synchronization, a tag is associated with each piece of work that defines the type of processing to be performed.

The POW module 228 selects (i.e. schedules) work for a core 202 and returns a pointer to the work queue entry that describes the work to the core 202. Each piece of work (a packet processing operation) has an associated group identifier and a tag.

The tag is used by the core to order and synchronize the scheduled work. The tag includes a tag value and a tag type. The tag value allows work for the same flow (from a source to a destination) to be ordered and synchronized. The tag type selects how the work is synchronized and ordered. There are three different tag types: ordered (ordering is guaranteed), atomic (ordering and atomicity are guaranteed) and null (no ordering is guaranteed.) A core accesses a data structure (or has a tag) "atomically" when no other cores can simultaneously access the same data structure. Thus, atomicity guarantees that at most one core has a given tag. The initial tag associated with the work is dependent on the originator of the work. This tag can be modified through a tag switch operation initiated by a core.

For example, when processing a Firewall/Virtual Private Network (VPN) packet, some processing stages only require ordering and others require both ordering and synchronization. An ordered tag type can be used during a de-fragmentation phase so that fragments for the same flow are ordered. An atomic tag type can be used during IPSec processing to provide synchronization between packets that use the same IPSec tunnel. Thus, after a core has completed the de-fragmentation processing of the packet, the core initiates a tag switch operation to switch the tag type of the work for next packet processing operation (IPSec decryption) to atomic prior to performing IPSec processing on the packet. After the tag switch operation has completed, the IPSec processing may be performed by the same core or a different core.

The group identifier is used to select one or more cores to which the work can initially be scheduled. As all work is not equal, the group identifier allows different work to be performed on different cores. For example, packet processing can be pipelined from one group of cores to another, by defining the groups from which a core will accept work. A core can de-schedule scheduled work in order to transfer work from one core group to another or to avoid consuming a core for work that requires a long synchronization delay. The work is de-scheduled by the core by initiating a tag switch operation to change the tag type to null. When re-scheduling the work, the group identifier is used by the POW module to select a core to which the de-scheduled work is to be re-scheduled.

Prior to describing the operation of the POW module in further detail, the other modules in the core will be described. After the packet has been processed by the cores 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

The network services processor 100 also includes application specific co-processors that offload the cores 202 so that the network services processor achieves high-throughput. The application specific co-processors include a DFA co-processor 244 that performs Deterministic Finite Automata (DFA) and a compression/decompression co-processor 208 that performs compression and decompression.

Each processor core 202 is a dual-issue, superscalar processor with instruction cache 206, Level 1 data cache 204, built-in hardware acceleration (crypto acceleration module) 200 for cryptography algorithms with direct access to low latency memory over the low latency memory bus 230. The low-latency direct-access path to low latency memory 118 that bypasses the L2 cache memory 212 and can be directly accessed from both the cores 202 and a DFA co-processor 244.

The network services processor 100 also includes a memory subsystem. The memory subsystem includes level 1 data cache memory 204 in each core 202, instruction cache in each core 202, level 2 cache memory 212, a DRAM controller 216 for external DRAM memory and an interface 230 to external low latency memory. The memory subsystem is architected for multi-core support and tuned to deliver both high-throughput and low-latency required by memory intensive content networking applications. Level 2 cache memory 212 and external DRAM memory 108 (FIG. 1) is shared by all of the cores 202 and I/O co-processor devices.

Each core 202 is coupled to the L2 cache by a coherent memory bus 234. The coherent memory bus 234 is the communication channel for all memory and I/O transactions between the cores 202, an I/O Bridge (IOB) 232 and the Level 2 cache and controller 212.

A Free Pool Allocator (FPA) 236 maintains pools of pointers to free memory in level 2 cache memory 212 and DRAM. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the cores 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processor cores 202 to move data asynchronously between local memory in the network services processor and remote (PCI) memory in both directions.

Figure 3:
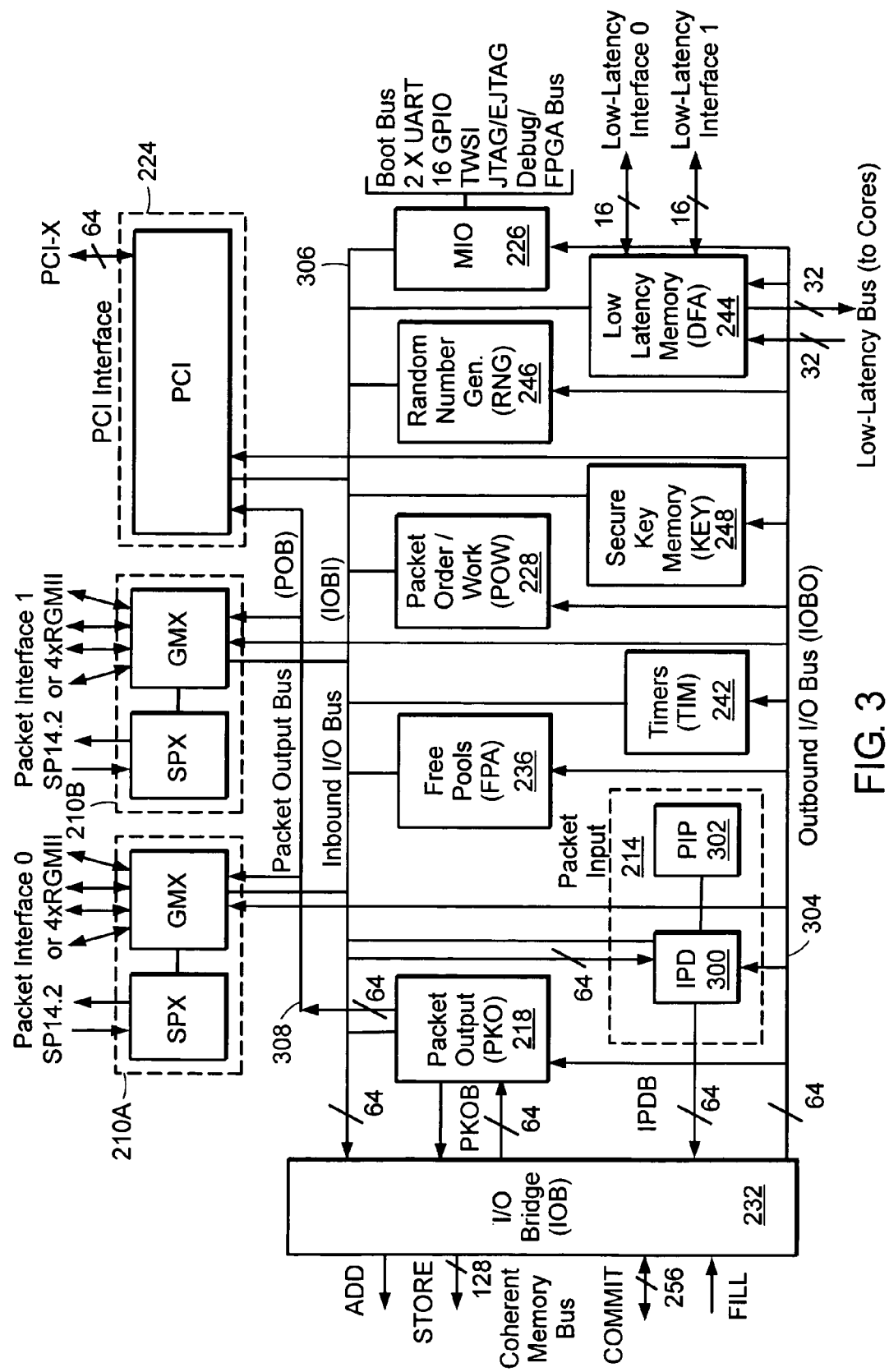
FIG. 3 is a block diagram illustrating the units for performing input and output packet processing in the network services processor shown in FIG. 2.

FIG. 3 is a block diagram illustrating in more detail the units for performing input and output packet processing in the network services processor shown in FIG. 2.

As already discussed in conjunction with FIG. 1 and FIG. 2, packets are received through any one of the interfaces units 210a, 210b or the PCI interface 224. The interface units 210a, 210b and packet input unit 214 perform parsing of received packets and check the results of the parsing to offload the cores 202. The interface unit 210a, 210b checks the L2 network protocol trailer included in a received packet for common exceptions. For example, the Frame Check Sequence (FCS) field in the L2 network protocol trailer stores the result of a CRC calculation on the bits of the frame performed by the sender of the packet. The interface unit 210a, 210b performs the same CRC calculation of the received packet and compares the result with the value stored in the FCS field. The interface unit 210a, 210b may not accept the packet if an error is detected, that is, the packet is dropped. If the interface unit 210a, 210b accepts the packet, the Free Pool Allocator (FPA) 236 allocates memory in L2 cache memory or DRAM for the packet and the packet is stored in memory.

The packet input unit 214 includes a Packet Input Processing (PIP) unit 302 and an Input Packet Data unit (IPD) 300. The packet input unit 214 uses one of the pools of pointers in the FPA 236 to store received packet data in level 2 cache memory or DRAM and another pool of pointers to allocate work queue entries. Work queue entries will be discussed later in conjunction with FIG. 4.

The I/O busses include an inbound bus (IOBI) and an outbound bus (IOBO), a packet output bus (POB), a PKO-specific bus (PKOB), an input packet data bus (IPDB), and associated controls. The interface unit 210a, 210b places the 64-bit packet segments from the received packets onto the IOBI bus. The IPD 300 in the packet input unit 214 latches each 64-bit packet segment from the IOBI bus for processing. The IPD 300 accumulates the 64 bit packet segments into 128-byte cache blocks. The IPD 300 then forwards the cache block writes on the IPDB bus. The I/O Bridge 232 forwards the cache block write onto the Coherent Memory Bus (CMB).

The packet input unit 214 performs pre-processing of L3 and L4 network protocol headers included in the received packet. For example, L3 network protocol pre-processing for an IP header includes checking the IP version field to determine if the IP version is version 4 or version 6, verifying the header checksum field that the value stored in the Time To Live (TTL) field is greater than zero, and checking the option fields. The packet input unit 214 supports Internet Protocol version 4 (IPv4) and Internet Protocol version 6 (IPv6) traffic. L4 pre-processing for TCP/UDP header includes verifying the port number field, the checksum field, the value stored in the length field and the flags field. The packet input unit 214 also extracts values stored in fields in the L3 and L4 network protocol headers for further processing by the cores.

The Packet Order/Work (POW) unit 228 implements hardware work queuing, hardware work scheduling and tag-based synchronization and ordering to queue and schedule work for the cores. A work queue entry is added to a work queue by the packet input unit 214 for each packet arrival. The work queue entry is the primary descriptor that describes work to be performed by the cores and will be described later in conjunction with FIG. 4. The work queue entry may be created by the PIP/IPD module 214 or a core 202. The PIP/IPD module 214 submits the work to the Packet order/work (POW) unit 228 for each packet arrival.

Work identified by a work queue entry stored in L2 Cache/DRAM enters the Packet Order/Work (POW) unit 228 through one of a plurality of POW input queues. In an embodiment, there are 8 POW input queues and the POW module includes 2048 POW entries. The POW entry will be described later in conjunction with FIG. 5. The POW module 228 uses POW entries to order, schedule, and synchronize work identified by work queue entries. The POW module 228 stores a pointer to a work queue entry in a POW entry and provides the pointer to a work queue entry to the core in response to a request from the core for work.

The different POW input queues can be used to provide different service levels. The Packet Input Processing (PIP) unit 302 can classify packets into one of the eight input work queues in the POW 228 using default values, Virtual Local Area Network (VLAN) priorities and IP Diffserve values configurable on a per-port basis.

The timer unit 242 is used to schedule work for the cores. The Timer unit manages rings having a programmable number of buckets stored in level 2 cache memory 212 or DRAM 108 (FIG. 1). Each bucket stores a list of timer entries. Each timer entry stores a work queue entry pointer. The time period between buckets in each ring is programmable. At each periodic bucket time expiration, the next bucket in the ring is processed and the work defined by the work queue entry pointers stored in the timer entries in the bucket is scheduled.

Figure 4:
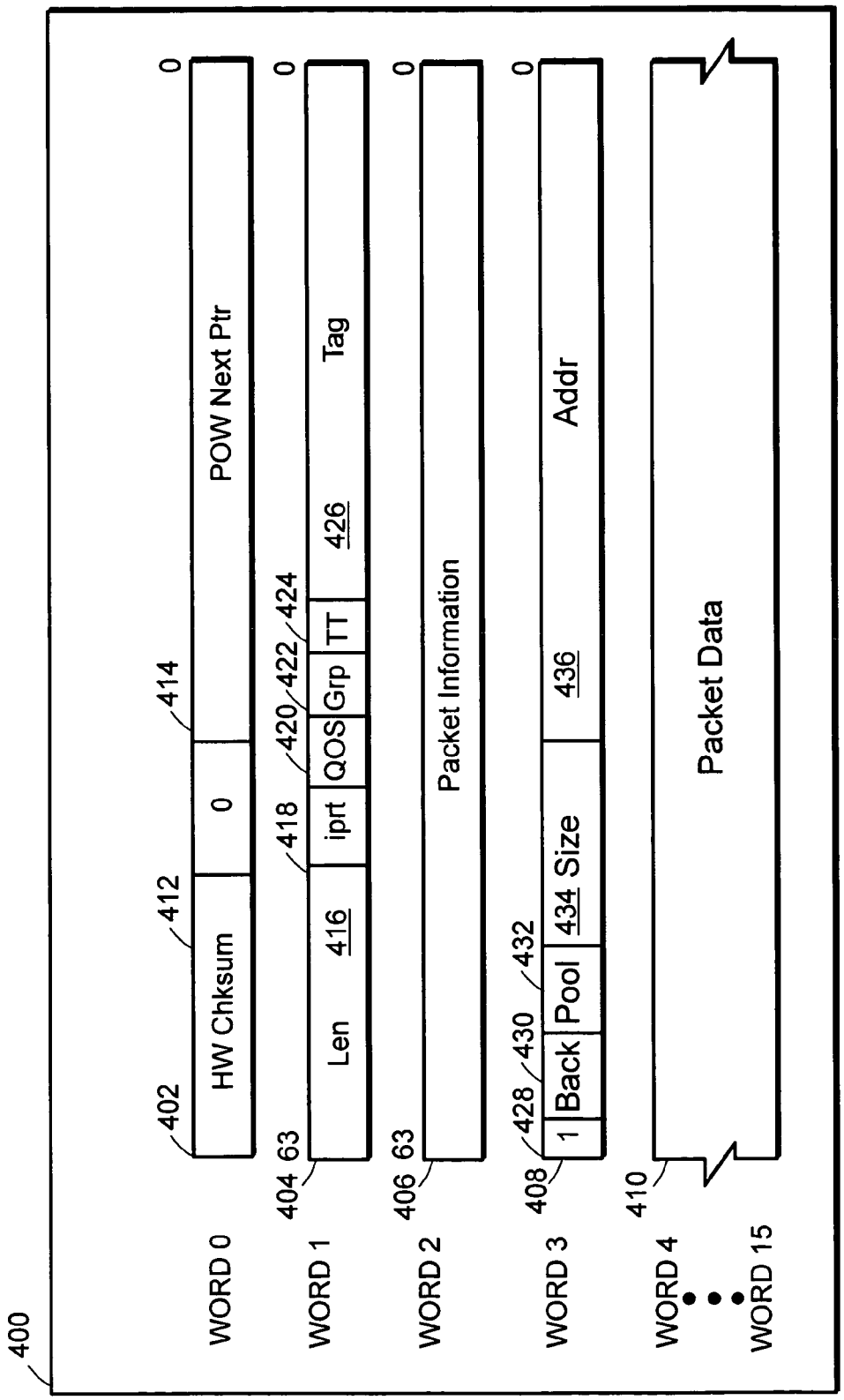
FIG. 4 illustrates a work queue entry that can be stored in L2 cache or DRAM.

FIG. 4 illustrates a work queue entry 400 that can be stored in L2 cache 212 or DRAM 108. Words 402, 404 of the work queue entry 400 are used by the Packet Order/Work (POW) module 228 to schedule work for the cores.

Word 402 includes a hardware checksum field 412 for storing a hardware checksum and a next pointer field 414 for storing a pointer to the next work queue entry to implement a memory input queue. In one embodiment, the hardware checksum is a hardware generated 16 bit ones-compliment sum of the packet data that is calculated over the packet. The next pointer field 414 is used to link work queue entries.

Word 404 includes a length field 416, an input port (iprt) field 418, a QOS field 420, a Group field 422, a TT field 424 and a tag field 426. The length field 416 stores the total number of bytes of packet data in the work queue entry 400. In an embodiment, the length can range from 1 to 65535 bytes. The input port field 418 stores the input port that the packet arrived on. The QOS field 420 stores an input queue in the POW module 228 selected by the packet input unit 214. The packet input unit 214 can select the input queue based on a default value per port or fields in the received packet, for example, based on VLAN ID, or a diffserv DSCP field. The group field 422 stores a core group number for the work. The TT field 424 stores the initial tag type of the work queue entry. The tag type can be null, ordered or atomic. The tag type can be different for IP and non-IP packets, IPv4 and IPv6 packets, and TCP and non-TCP packets. The initial tag value is assigned by the IPD unit 300 and can be based on the port number that the packet arrived on, the IP source and destination addresses, IP protocol next header value and the TCP/UDP source and destination ports. The POW module 228 reads the value of the QOS field to select an input queue. The POW module 228 also reads the value of the Group, TT and Tag fields when adding work to an input queue.

The tag field 426 in word 404 of the work queue entry allows each piece of work to be tagged. The PIP/IPD module 214 creates the initial tag information and stores it in the work queue entry. For example, the PIP/IPD module can create the tag by performing a hash of the standard TCP five-tuple (IP source address, IP destination address, IP protocol, TCP source port, TCP destination port) defining a "flow". The Packet/Order Work (POW) module 228 uses this initial tag information for synchronization, ordering, and scheduling. Two pieces of work are ordered and/or synchronized when they share the same tag value stored the tag field 426 and tag type stored in the TT field 424 of word 404. Two pieces of work may be unrelated and can execute entirely in parallel on different cores when they have a different tag or tag type values. The same flow will have the same tag value, so it may be ordered and synchronized. Different flows will likely have different tag values, so will likely not be ordered and synchronized, and can be executed completely in parallel on different cores.

Word 406 stores information regarding the packet data, for example, information extracted from the packet headers during input packet processing. The information can include an indication as to whether a Virtual LAN identifier was found in the L2 protocol header, whether the packet is UDP or TCP, whether the destination MAC address field in the L2 header is broadcast or multicast and whether the packet requires IPSec decryption. The information also includes the number of buffers used to store the packet data.

Word 408 is a buffer descriptor. The address field 436 stores the address of the first byte of packet data in the buffer. The size field 434 stores the number of bytes of packet data stored in the buffer. In one embodiment, the pool field 432 and the I field 428 are set to '0' and the back field 430 stores the number of cache blocks from the address stored in the address field 436 to the beginning of the buffer.

Words 410 store packet data dependent on the type of packet. The format of the packet data stored in the queue entry is beyond the scope of the present invention.

The POW module 228 has a plurality of POW entries that reside on various lists, including POW input queues. Typically, each POW entry includes a pointer to a work queue entry stored in L2 Cache/DRAM. Work queue entries can be used to extend the POW input queues.

Figure 5:
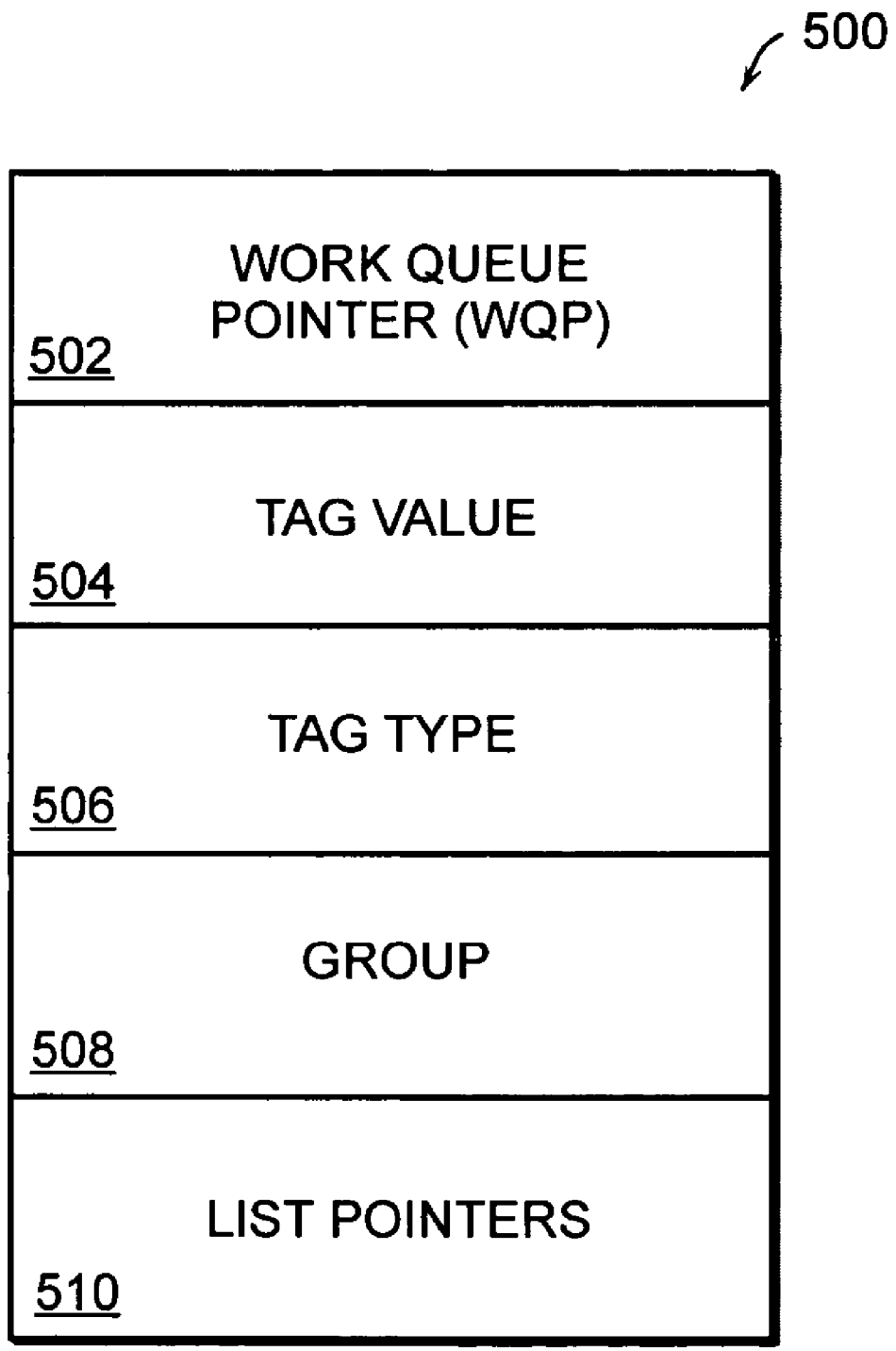
FIG. 5 illustrates a Packet Order Work entry.

FIG. 5 illustrates a POW entry 500. The POW entry 500 stores a work queue pointer (WQP) 502. In one embodiment, the WQP is a 64 bit aligned pointer into L2 cache 212 or DRAM 208 that points to a work queue entry 400.

The POW entry 500 also stores the current tag value 504 and tag type 506 assigned to the work described by the associated work queue entry 400, the current group or groups 508 associated with the work and other pointers 510 that are used to link the POW entry 500 into various lists in the POW module 228.

The POW module 228 orders scheduled work through the use of tag values and tag types. The tag value allows work for the same flow (from a source to a destination) to be ordered and synchronized. For example, the tag value can be a hash of the standard TCP five-tuple (IP source address, IP destination address, IP protocol, TCP source port, TCP destination port) in the header of a data packet defining a "flow". The same flow has the same tag value, so it can be ordered and synchronized. Different flows likely have different tag values, so will not be ordered and synchronized, and can be executed completely in parallel on different cores. In one embodiment, the tag value is a 32 bit value. The tag type 506 identifies the type of ordering and synchronization to be performed.

In one embodiment, each piece of work identified by a POW entry 500 is assigned one of three tag types: null, ordered, or atomic. No ordering is guaranteed with the null tag type. Ordering is guaranteed for work having an ordered tag type. Ordering and atomicity are guaranteed for work having an atomic tag type. Two pieces of work with an atomic tag identifier cannot simultaneously hold the same tag value.

Different types of work use the same POW module 228. As all work is not equal, the POW supports a plurality of groups. In one embodiment, the POW module supports 16 different groups. Groups provide a means to execute different functions on different cores, even though all cores share the same POW module 228. For example, packet processing can be pipelined from one group of cores to another group of cores, with the first group performing the first stage of the work and the next group performing the next stage of the work by defining the groups from which a core will accept work. Groups allow each core to specify the types of work it will accept, allowing the POW module 228 to dynamically distribute the work to available cores.

A processor core 202 requests work from the POW module 228. Typically, the core polls the POW module to find work. However, in some cases the POW module 228 can be selected to interrupt the core when it has work for the core. The POW module 228 selects, that is, schedules the work to the core based on the groups from which the core accepts work. The POW module 228 has a POW core group mask register per core. Each group mask register is implemented as a bit mask, having one bit per group, allowing the core to specify combinations of groups that it will accept work from.

The POW module 228 does not schedule a piece of work for a core if the core does not accept the group associated with the work. A value of zero in the core group mask register prevents the core from receiving any new work. In an embodiment with sixteen groups, the group mask register has sixteen mask bits in the mask register, one bit per group. A '1' in a bit position sets the core's membership in the corresponding group.

Figure 6:
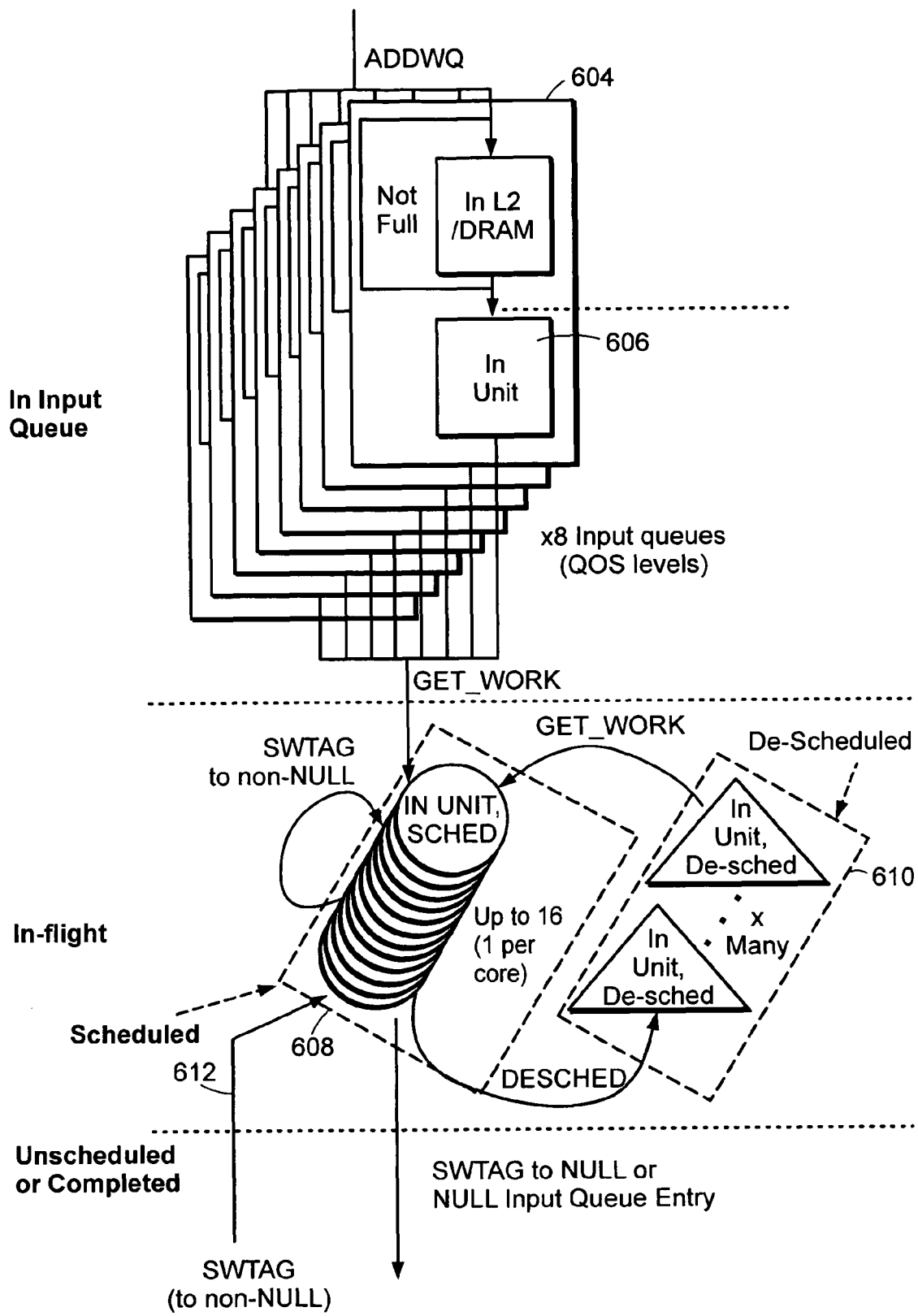
FIG. 6 illustrates states of work flowing through the Packet order/work unit.

FIG. 6 illustrates states of work flowing through the POW module 228. Work enters the POW module 228 through one of a plurality of input queues 604 and is identified by a POW entry 500 that can be stored in L2 Cache/DRAM or in the POW module. Work is scheduled by the POW module from a list of POW entries 606 in an input queue 604 in response to a GET_WORK request from a core.

Work is scheduled by moving the POW entry in the POW module from the input queue 604 to an in-flight queue. The in-flight queue is selected based on the tag/type values stored in the POW entry 500. With 16 cores, work identified by 16 POW entries can be scheduled in parallel, one per core. After the work has initially been scheduled by the POW to an in-flight queue, the scheduled work 608 can be moved between in-flight queues by a core by executing a tag switch operation.

Scheduled work can be de-scheduled by a core. The de-scheduled work 610 remains in in-flight and is re-scheduled later by the POW module to one of the cores Unscheduled work (from the perspective of the POW module) can be scheduled by a core through a tag switch 612 to change the tag type from null to ordered or atomic.

Figure 7B:
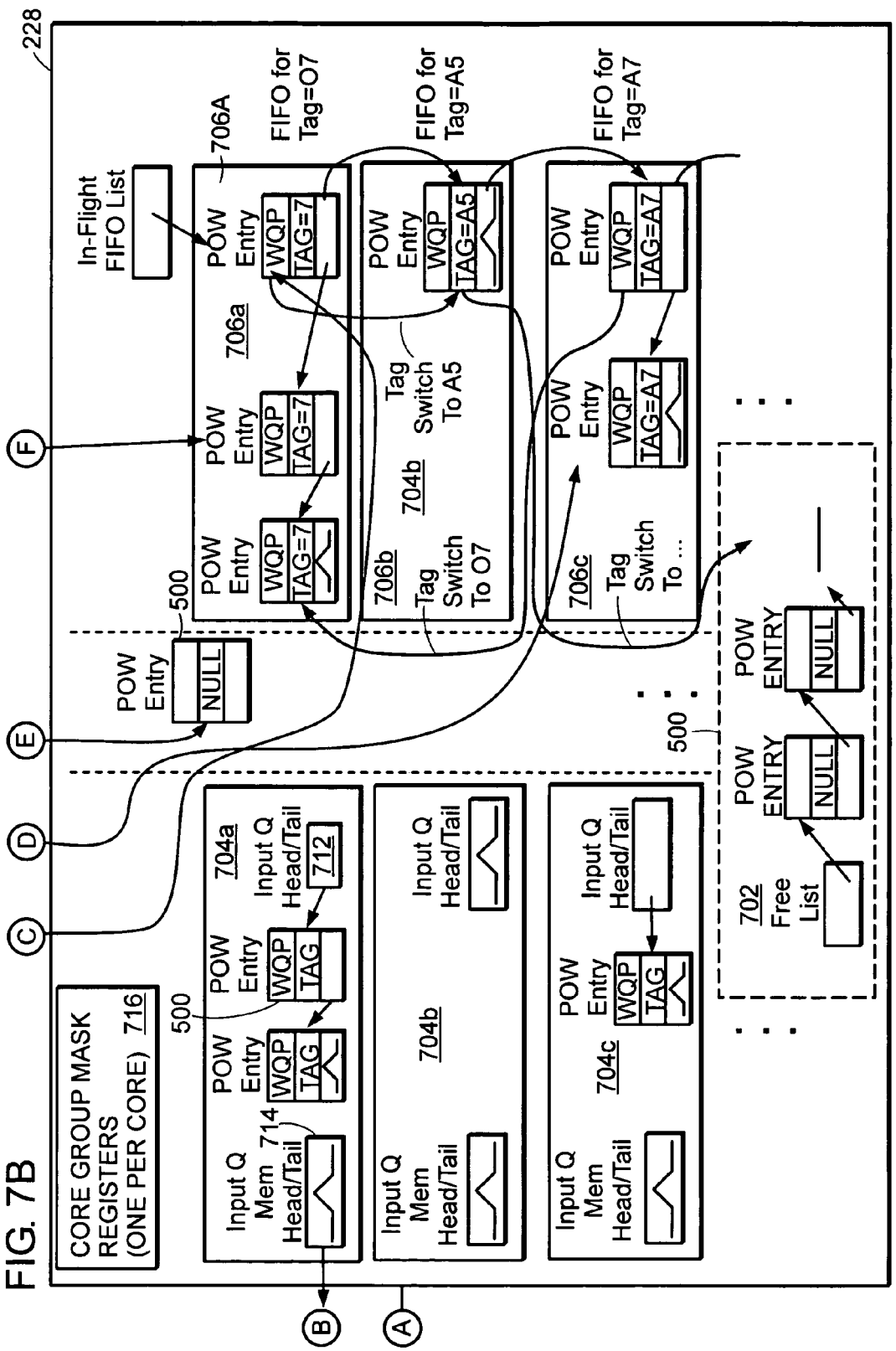
FIG. 7 is a block diagram illustrating Packet order/work entries in various lists in the Packet order/work unit.

FIG. 7 is a block diagram illustrating POW entries 500 in various lists in the POW module 228. POW entries 500 are queued in an input queue 704a-c or an in-flight queue 706a-c. POW entries 500 can also be in a free list 702 or associated with a core 202.

Work enters the POW module through an input queue 704a-c. In the embodiment shown, three input queues 704a-c are shown. Each input queue 704a-c includes input head and tail pointer 712 to a list of POW entries and an input queue memory head and tail pointer 714 to a list of work queue entries 708 that are stored in memory 710 that is external to the POW module 228.

Although the number of POW entries 500 are limited, the POW module 228 appears to have infinite work queues. If a POW entry 500 is not available from the free list 702, the POW module 228 adds work to the input queue by adding a work queue entry through the input queue memory head and tail pointers (memory list) 714. If the POW module adds work through a work queue entry 708, it later automatically moves the work from memory 710 into a POW entry 500 as soon as a POW entry 500 becomes available, in the order than the work was originally added to the input queue 704a-c.

Two POW entries 500 are in the first input queue 704a and the input queue head pointer 712 points to the POW entry at the head of the first input queue. The first input queue is extended by a work queue entry 708 stored in memory. The input queue memory head pointer 714 points to the work queue entry 708. The second input queue 504b is empty; that is, there are no POW entries. There is one POW entry 500 in the third input queue 504c.

The POW entries 500 in the free list 702 are available for allocation to any of the input queues 704a-c. If a POW entry 500 is available on the free list 702, the POW module 228 allocates the POW entry 500 from the free list 702 for the input queue 704a-c and stores the tag value, tag type and group associated with the work queue entry in the allocated POW entry. A pointer to the work queue entry (WQP) 400 stored in memory 710 is also stored in the POW entry 500. The POW entry is freed by placing it on the free list 702.

Cores 202 request work from the POW module 228 and the POW module 228 schedules the work identified by POW entries in the input queues 704a-c to the requesting cores.

Upon receiving a request for work from one of the cores, the POW module schedules one of the POW entries 500 in one of the input queues 704a-c. The scheduled POW entry 500 is based on the group identifier stored in the group field 508 of the POW entry 500 and the groups supported by the requesting core identified by the core group mask register for the core 716. The POW entry is scheduled by moving it to an in-flight list 706a-c. The in-flight list is selected based on the tag/type values stored in the tag value field 504 and tag type field 506 in the POW entry 500. Work identified by POW entries that are in an in-flight list (queue) 706a-c is referred to as "in-flight" work.

The POW module includes a number of quality of service features to prioritize input queues differently and keep work flowing smoothly through the unit. One quality of service feature is thresholds to limit the number of POW entries consumed by individual input queues 704a-c. Each input queue 704a-c has an associated maximum number of POW entries. Once the maximum number of POW entries is reached, the input queues 704a-c are extended through the use of work queue entries 708. There is also a minimum number of free POW entries per input queue. While the number of available POW entries is smaller than the minimum, no POW entries are allocated to the input queue.

Another quality of service feature is the mechanism to control the input queue traversal. The POW module traverses all input queues 704a-c in parallel when it is searching for new work to schedule to a core 202. The search proceeds in rounds. In one embodiment, the 32 rounds that the POW module uses can be configured through configured round fields. In an embodiment with 8 input queues, each configured round is an 8-bit bit-mask indicating the input queues that can participate in the round. The priority of an input queue is dependent on the number of rounds that it can participate in. For example, the highest priority input queue participates in all 32 rounds and the lowest priority input queue participates in one of the 32 rounds. Thus, assuming that there are schedulable items in each queue, one item is scheduled from a low-priority input queue for every 32 items scheduled in the highest priority queue.

To schedule work to a core, the POW module 228 first scans de-scheduled work on a de-schedule list 610. After that, the POW module scans the input queues starting at a current round and current input queue. The remaining queues that participate in the current round are sequentially scanned for work first. Rounds are scanned circularly. Each input queue is scanned in order, and different input queues are scanned in the order indicated by the round configuration. When the POW module finds schedulable work from the input queue, it delivers the work to the core, moves the work to an in-flight queue dependent on the tag and updates the current queue/round so that the next work request starts from the queue/round that sequentially follows the position where the last schedulable work was found.

Conceptually, POW entries are organized in an in-flight queue in First-In-First-Out (FIFO) order, with an in-flight queue 706a-c associated with each unique tag and tag type value combination. POW entries in in-flight queues have one of two tag types (atomic or ordered). The POW module can, in some cases, remove work from an ordered list out-of-order when the work has a pending tag switch to null tag type.

At any given time, only one piece of work can be scheduled to a particular core 202. Thus, the number of pieces of work that can be scheduled is limited to the number of cores. In one embodiment, there are sixteen processor cores 202 allowing sixteen pieces of work to be scheduled.

The POW module 228 in combination with the cores 202 uses the tag/type values stored in the POW entry 500 to order and synchronize related work, and allow unrelated work to be unordered and unsynchronized. This allows efficient multi-core execution. Two pieces of work are related and are ordered and synchronized when they share the same tag value and tag type. Two pieces of work identified by POW entries can execute in parallel on different cores 202 when they have different tag or tag type values.

Three in-flight lists 706a-c with POW entries stored in FIFO order are shown in FIG. 7. Work enters an in-flight list 706a-c when the POW module 228 either schedules work from an input queue 704a-c or re-schedules de-scheduled work. Only POW entries with atomic and ordering tag type are stored in in-flight queues 706a-c. In the example shown in FIG. 7, POW entries for packets with tag 'O7', that is, a tag identifier of 7 and a tag type of ordered (O) are stored in in-flight list 706. POW entries for packets with tag A5; that is, a tag identifier of 5 and a tag type of atomic (A) are in in-flight list 706b. POW entries for packets with tag 'A7', that is, identifier of 7 and tag type of atomic (A) are stored in the 'A7' in-flight list.

A POW entry 500 or work queue entry 708 in the input queue stores the initial tag value assigned to the work. The initial tag value is assigned by the packet input unit 214 or the core 202 dependent on the originator of the work. The tag value 504 and tag type 506 for a piece of work can be changed through a tag switch instruction executed by a core.

The core can perform a tag switch by modifying the tag and the tag type as the in-flight work identified by POW entries in the in-flight lists progresses through different processing phases. A tag switch can result in a POW entry moving from one in-flight queue to another in-flight queue or in the in-flight work being de-scheduled or completed. Tag switches will be described later in conjunction with FIG. 8.

The POW module maintains order across tag switches. Any in-flight work that executes the identical series of tag switches, each with the same tag/type values, while in-flight are ordered identically through each tag switch. If the following conditions are true, the POW module can order the processing of all packets in a flow: (1) all packets from the same flow enter the POW module via the same input queue with the same initial tag value and group; and (2) packets from the same flow are processed with the same sequence of non-null (ordered or atomic) tag switches.

The POW module 228 keeps work that is identified by a work queue entry 708 in an input queue 704a-c in-order on a per queue basis. Work identified by POW entries 500 in input queues 704a-c can be scheduled out of order. The POW module scheduler skips over POW entries 500 in the input queue 704a-c that cannot be immediately scheduled when it searches for schedulable work. The POW module does not skip past work identified by POW entries with tag type of ordered or null. Thus, the POW module schedules work having these tag types and the same group identifier in input queue order. The POW module skips work identified by a POW entry having a tag type of atomic and a tag value that cannot immediately be scheduled, and so only guarantees tag order for work identified by a POW entry in the input work with tag type of atomic that has the same group. The POW module skips over work identified by POW entries in the input work queue that is not in the desired group, so no ordering is implied between POW entries in input queue entries that have different group identifiers.

After the work is scheduled, work is in-flight and ordering is based on tag and tag type values. The ordering of scheduled in-flight work is not dependent on the group identifier associated with the work. Scheduled work is a subset of the POW module's "in-flight" work. Work that has a tag value of atomic or ordered remains scheduled after the completion of a tag switch transaction. A core can de-schedule the in-flight work and the POW module can re-schedule the work later. The in-flight work also includes scheduled work that is de-scheduled by a core. De-scheduled work remains in-flight, and will be re-scheduled later, but is not currently executing on a core. De-scheduling of work can be used to implement "work pipelining" by transferring work from one core group to another. It can also be used to avoid consuming a core for work that requires a large synchronization delay and to make work interruptible. Work that is de-scheduled is assigned a tag type of null. The POW module reschedules previously de-scheduled work at a higher priority than it schedules new work from an input queue.

The group identifier is used to determine the cores to which de-scheduled in-flight work can be rescheduled. The POW module does not force any ordering nor synchronize in-flight work that uses different tag values or different tag type values. This in-flight work freely executes in parallel.

The FIFO order implies all ordering and synchronization constraints. For work having an ordered tag type, the FIFO order indicates the order of the work. Any POW entry having an ordered tag value type can be executed but only the POW entry at the head of the list can leave the in-flight list. In-flight queue 706a is ordered, thus each of the three pieces of work has successfully switched to the ordered tag. The head of the in-flight queue 706a cannot have a pending switch, but the remaining work can have a pending switch to a different ordered or atomic tag type. If work that is not at the head of the in-flight queue has a pending move, for example, due to a pending ordered or atomic tag switch, the move cannot occur until the head moves.

For work having an atomic tag type, the FIFO order indicates the order that the work will switch to the atomic tag type. The head of the atomic in-flight list is the only work that has successfully switched to the atomic tag type. Thus, only the head of a list of POW entries with an atomic tag value type can be executed at any time. In the A7 in-flight queue, the switch to A7 is complete for the head entry in the in-flight queue, but is pending for the other work identified by the other POW entries. No work in any atomic in-flight queue can have a pending tag switch to a different tag.

During any ordered or atomic tag switch, the POW module moves the pointer to the POW entry at the head of one in-flight queue to the tail of another in-flight queue. The movement of the pointer completes a switch to an ordered tag type, but for an atomic tag type, the switch is not complete until the POW entry reaches the head of the in-flight queue. Thus, the work identified by the POW entry at the head of an in-flight queue never has a pending switch, or else the POW module would immediately execute the move required by the switch. The A5 in-flight queue has only one POW entry so there can be no pending tag switches. The one piece of work identified by the POW entry holds the atomic tag.

A core can be scheduled to in-flight work or non-scheduled work. Five cores are shown in FIG. 7. Core 0 has an attached POW entry, but the entry is not scheduled. Core 1 is non-scheduled, that is, it does not have an attached POW. Core 2, Core 3 and Core 4 are scheduled to in-flight work. Core 2 may currently be in the ordered state, or may have a pending switch to another state. Core 3 has a pending switch to the atomic state. Core 4 is in the ordered state and has no pending switches.

In response to a request for work from a core, the POW module can also schedule de-scheduled work to cores in response to a request for work. De-scheduled work has a higher priority than work in the work queue. The POW module does not schedule de-scheduled work that has a pending task switch, and does not schedule a POW entry in the input queue having an atomic tag type unless it can immediately have the tag. Thus, the POW module only schedules work when it can make forward progress. POW entries in the input queue having a null tag type are immediately de-scheduled.

As discussed in conjunction with FIG. 6, work also enters the POW module when an unscheduled (from the perspective of the POW module) core executes a tag switch transaction. Work that enters the POW module this way is immediately scheduled. After it is scheduled, the work is not distinguishable from other scheduled work.

The POW module can prefetch work for all cores during cycles that would otherwise be idle. Thus, transactions to get work can complete with minimum latency, excluding bus contentions that transfer the work to and from the unit. However, changes to the group mask associated with the core and tag switch transactions invalidate the prefetch.

Figure 8:
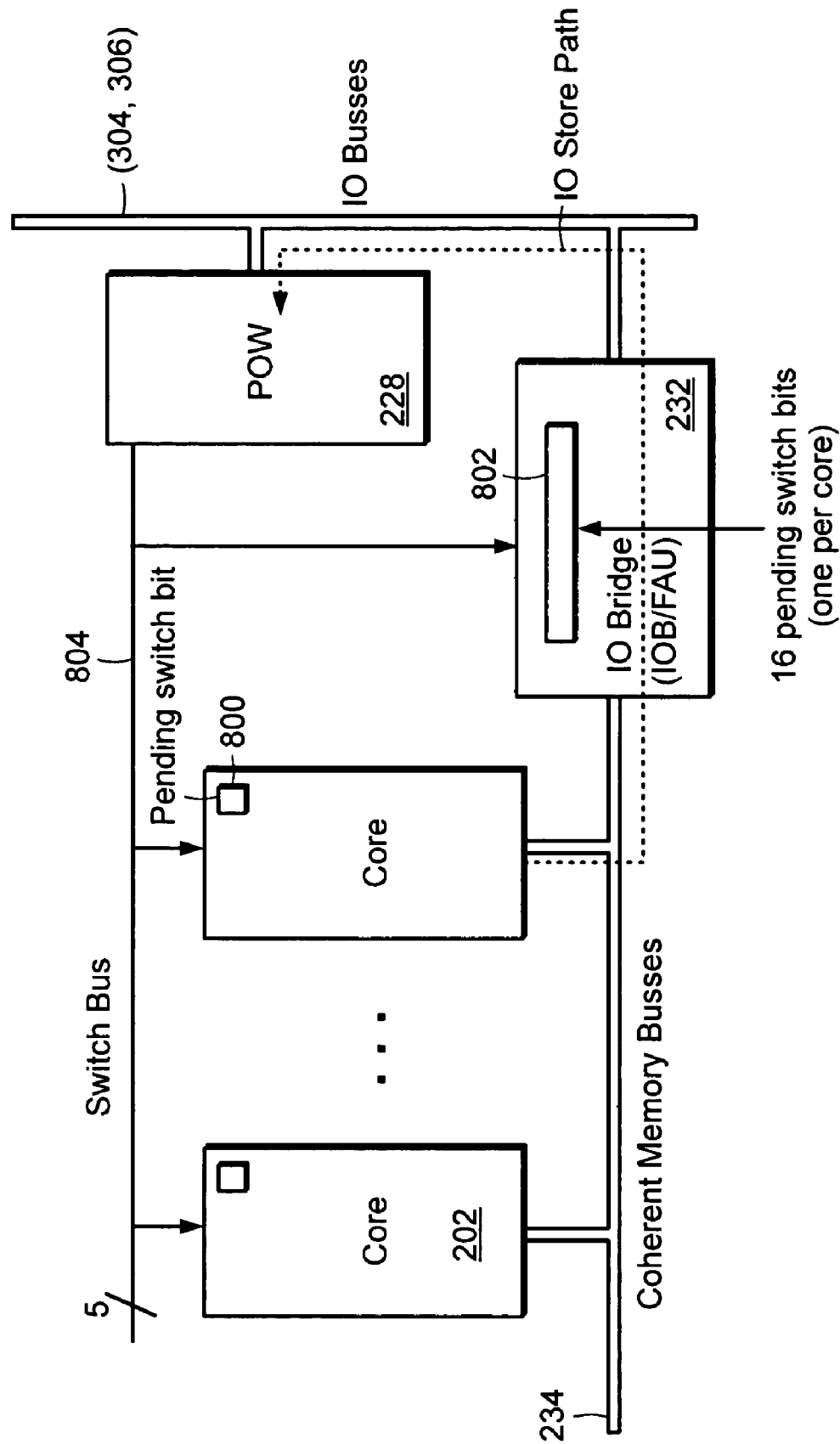
FIG. 8 is a block diagram illustrating a dedicated tag switch bus coupled to the cores Packet order/work unit and IO Bridge.

FIG. 8 is a block diagram illustrating a dedicated tag switch bus coupled to the cores, POW module and IO Bridge. A tag switch operation includes a request and completion: (1) A core transfers the new tag to the POW module, and (2) The POW module indicates successful completion of the tag switch to the core. The core transfers the new tag primarily through an Input/Output (IO) store mechanism. The tag switch operation starts with a core executing an I/O store instruction to set a pending tag switch bit in the core. In one embodiment, the store for a tag switch includes an op code stored in the op field and a tag stored in the data portion of the store. This store enters a write buffer in the core 202, is reflected across the coherent memory bus 234, sent through the IO bridge (IOB)/FAU 232, onto the IO bus 304, and enters the POW module 228.

Each core has a respective pending switch bit 800. A copy of the pending switch bits 802 from each of the cores is stored in the IOB/FAU 232. In addition, the POW module stores a pending switch state. The pending switch bits inside a core are set when the core starts a switch operation by executing a store instruction to an IO space physical address destined for the POW module. When an appropriate subdid is used in the address, for example, address bits <42:40>, the pending switch bit corresponding to the core is set in the core. The FAU also sets it pending switch bit for the core when it sees the same store instruction. The FAU uses the pending switch bit to delay selected requests until after the switch completes. A core can have, at most, one outstanding tag switch, so only one pending switch bit is required.

Upon receiving a tag switch request from a core 202, the POW module 228 changes the tag value and/or tag type in the POW entry 500, moves the POW entry 500 to another in-flight list 706a-c dependent on the values of the tag and tag type and provides an indication of the completion of the tag switch over a dedicated tag switch bus 804. The tag switch completion from the POW module clears the pending tag switch bit 800 in the respective core and the FAU. The tag switch operation has separate switch request and switch completion wait operations. The POW module completes a requested tag value switch when the required ordering and atomicity constraints for the work are met. This separated switch transaction allows the core to overlap the latency due to the switch request with other work and to de-schedule the work while a tag switch is pending, thus avoiding long synchronization delays.

The completion of the tag switch is sent over the dedicated switch bus 804. In an embodiment, the switch bus 804 has 5 bits, 4 of the 5 bits are used to select the particular core (one of 16) being addressed, and the other bit (valid bit) is used to indicate whether the switch is valid on the given cycle. When the POW module successfully completes a tag switch operation, it clears its pending switch state for the core, encodes the core ID on the four bits of the switch bus 804, and validates it by setting the valid bit. Both the cores and IOB/FAU snoop the switch bus 804 and clear the pending switch bit 800 for the core selected by the core ID when the POW module indicates a successful tag switch.

The dedicated switch bus 804 minimizes the coherent/IO bus bandwidth required to complete tag switches, with only 5 wires (bits/signals) required. Bandwidth is minimized because the cores can poll for completion of the tag switch locally since each core need only consult the value of its local pending switch bit 800. Efficient polling is important because polling is required for efficient de-scheduling. This also allows IOB/FAU operations to be delayed until a tag switch completes. This is important for a number of applications. This also minimizes the latency to complete the switch.

Switch tag transactions are highest priority and complete with minimum latency, excluding bus contentions transferring the request to the POW module, if there are no synchronization/ordering conflicts.

The POW module synchronization support is very flexible and can be used in many different ways. An example of the synchronization will be described for Firewall/Virtual Private Network (VPN) packet processing is shown in Table 1 below. The example assumes that the processing of each packet can be divided into six application phases: (1) defragmentation, (2) IPSec decryption, (3) Lookup, (4) Process, (5) IPSec encryption, and (6) output queue. The example assumes that Internet Protocol (IP) version 4 is used. However, it can be easily modified for IP version 6 as is well-known to those skilled in the art.

TABLE 1

| Stage | Tag Type | Tag value (Phase ID/Phase tag) |
| --- | --- | --- |
| Defrag | Ordered | {0, hash (IPSrc, IPdest)} |
| IPSec-D | Atomic | {1, IPSEC SPI/SPA} |
| Lookup | Atomic | {2, hash (IPsrc, IPdest, IPprot, IPsrcport, IPdestport} |
| Process | Ordered | {3, hash (IPSrc, IPdest, IPprot, IPsrcport, IPdestport} |
| IPSec-E | Atomic | {4, IPSEC SPI/SPA} |
| O/P Q | Atomic | {5, Output Queue Index} |

IP input packets are de-fragmented during the defragmentation phase. As is well-known to those skilled in the art, due to limitations on the size of an IP packet that can be transmitted over a network, the data field of a large IP packet is fragmented and the fragments are sent in a series of smaller IP packets. A fragment offset field transmitted in the header of each fragment is used to reorder fragments. The IPSec decryption phase performs IPSec decryption for packets. The lookup phase finds the flow records and updates the state. The process stage performs processing of the packet that may be required before sending the packet out. For example, the packet may require Network Address Translation (NAT) or TCP sequence number adjustment. The IPSec encrypt stage performs IPSec encryption for packets. The output phase places the packet into an output queue to be sent out from the processor.

Each application phase is assigned a phase identifier (0-5). The tag value 504 assigned to each phase includes the assigned phase identifier and a phase tag. The phase identifier allows different processing phases to execute in parallel in a pipelined fashion by allowing a packet with the same flow identifier and tag identifier to execute simultaneously on different cores with any other packet that is in a different phase. Multiple packets within the same flow can also execute freely on different cores within the same flow, if they have different phase tag values.

The different phase identifiers also guarantee processing order among all packets in a same flow (and same direction). The goal is to expose many different tag values to the POW module so that it can parallelize as much work as possible, yet still guarantee that access to critical data structures is appropriately synchronized.

Generally, the phase tag is a hash result using a number of fields in headers of the packet to differentiate flows as much as possible and so that two packets from the same flow produce the same hash value. The phase tag can also be an index into a critical data structure or a combination of the hash result and the index.

Referring to Table 1, the defragmentation phase has an ordered tag type 506, and the tag identifier 504 includes a phase identifier of 0 and a phase tag derived from the result of a hash function performed on the IP source address and IP destination address included in the packet. Input packets are de-fragmented during the defragmentation phase. All input packets enter this phase, some of which may be fragmented, and fewer de-fragmented packets exit the phase. Any inbound packets in the same flow, fragmented or not, have identical values for the IP source and IP destination address fields, and have the same phase tag and so they will be ordered. Both unfragmented and de-fragmented packets from the same flow enter the next stage in order.

The fragments that enter but do not exit this stage switch to null tag type and are not processed in any other phases. When the last fragment creates a completely de-fragmented packet, the de-fragmented packet is processed in subsequent phases in place of the input fragment, so the de-fragmented packet assumes the work order of the input fragment. This gives the de-fragmented packet the ideal ordering; as if it instantly appeared with the last input fragment, even though the software processing time needed to create this de-fragmented packet from multiple input fragments may be large.

The IPSec decryption phase performs IPSec decryption for packets that need it. If not needed, this phase is skipped entirely. The tag type is atomic, phase identifier is '1' and the phase tag is derived from the Security Parameter Index (SPI) and the Security Association (SA) carried in the AH and ESP protocols. IPSec includes separate protocols including Authentication Header (AH), Encapsulating Security Payload (ESP), IP Payload Compression (IPcomp) and Internet Key Exchange (IKE). IPSec is described in the Internet (IETF) Network Working Group Request for Comments (RFC) 2401 at www.ietf.org/rfc/rfc2401.txt In general, IPSec processing requires some synchronization between different packets that use the same EPSec tunnel, for example, with data structures, like the anti-replay window. The anti-replay window is a 32-bit counter that is used to determine whether an inbound AH or EH packet is a replay. The architecture specifies a single atomic tag that covers the IPSec Security Association (SA) for the entire packet decryption. The phase tag value uniquely identifies the SA, so after the inbound tag switch completes, the core can freely access the tunnel data structure until the next tag switch.

All packets from the same flow have the same IPSec SPI/SA value and so remain ordered as they exit this phase. Packets from other flows that use the same tunnel are also serialized through this phase, and will exit this phase in order, but will likely have a different tag in the next phase, so will probably be unordered going into the next phase.

The lookup phase finds the flow (identified by a 5-tuple) records and updates the state. The example shown assumes a stateful firewall. A firewall prevents computers in a network from communicating directly with computers external to the network. Instead, all communication is routed through a proxy server that determines whether it is safe to let a particular message or file pass through to the network. A stateful firewall keeps track of network connections, such as TCP streams flowing across it. On the first packet of a flow, a fast-path flow record will not exist for the flow, so the flow must be validated and cached for later packets. The phase tag for this phase selects a particular hash bucket. Thus, the atomic tag serializes accesses to a bucket, and no further synchronization on the hash data structure may be required. No packets from a flow will observe (or modify) the flow state before the previous packets from the flow have updated the cached state.

With this cached architecture, it will likely take much longer to initially validate and cache the flow state than it will take to process subsequent packets. Thus, some packets may need to wait for the validation to complete before their lookup is successful. With some protocols, like TCP, this will not happen within the same flow, but long waits are still possible with other protocols or with packets from a different flow, that, unluckily, happen to collide in the same hash bucket. The de-schedule operation provided by the POW module can be used in these long-wait circumstances. The current work can be de-scheduled and other work executed and the POW module can re-schedule the work later when the atomic tag is available.

The process stage performs processing of the packet that may be required before sending the packet out. For example, the packet may require Network Address Translation (NAT) or TCP sequence number adjustment. NAT translation is the process of converting between IP addresses used within an Intranet or other private network (called a stub domain) and the Internet IP addresses. The process stage uses an ordered tag type with a hashed flow identifier for the phase tag. This forces order for packets in the same flow as they exit this stage, as precisely as possible. A packet can be dropped in either the lookup or the process stages without executing any further stages.

The IPSec encrypt stage performs IPSec encryption for packets that need it. If not needed, this phase is skipped. The tag usage is very similar to the IPSec decryption stage.

The output phase places the packet into an output queue to be sent out from the processor. The tag type is atomic to synchronize critical data structures needed for the enqueue. The phase tag identifies the exact output queue, so only references that use the same output queue are serialized. QOS calculations, for example, Random Early Detection (RED) can be performed during this phase to determine whether to drop the packet based on output queue sizes.

A tag switch operation defines the transition from one phase to the next. The PIP/IPD unit generates the initial tags for the packet, that is, the de-fragmentation phase. The tag is ordered and the tag value has phase id=0 and phase tag=hash (IPsrc, IPdest). The POW module schedules the work with the initial tag. The last switch (to tag type null that removes the work from the POW module) executes in the POW module and can be an implicit part of the work request to schedule the next packet. Thus, without the encrypt/decrypt phases only three tag switches are required to process the IPSec packet. As each phase has a unique tag value, different flows can be processed in parallel by multiple cores.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network services processor comprising:
    a plurality of independent processors, each processor operating in parallel to perform work comprising packet processing operations, each separate packet processing operation defining a piece of work; and
    a packet work order module configured to dynamically schedule work to be performed in parallel by the processors based on a tag associated with each piece of the work, the packet work order module including a plurality of in-flight lists, each in-flight list associated with a different tag for tracking in-flight work associated with the tag, the work being performed by the processors being stored in an input queue and the packet work order module scheduling work stored on the input queue to an in-flight list dependent on the tag associated with each piece of the work.

2. The network services processor of claim 1, wherein work in the input queue is stored in the packet work order module or in memory external to the packet work order module.

3. The network services processor of claim 2, wherein the tag includes a tag type and the in-flight list stores work having an atomic tag type that indicates only work at the head of the list is performable by one of the plurality of processors.

4. The network services processor of claim 2, wherein the tag includes a tag type and the in-flight list stores work having an ordered tag type that indicates all work on the list is performable, work being removable only from the head of the list by one of the plurality of processors.

5. The network services processor of claim 1, further comprising:
    a timer, the timer controlling when work is added to the input queue.

6. The network services processor of claim 1, wherein the work is configured to perform IPsec decryption.

7. The network services processor of claim 1, wherein the work is configured to perform IPsec encryption.

8. The network services processor of claim 1, wherein the work is de-fragmentation of a Virtual Private Network packet.

9. The network services processor of claim 1, wherein the work is adjusting TCP sequence numbers.

10. The network services processor of claim 1, wherein each input queue has an assigned priority.

11. The network services processor of claim 1, wherein each input queue is assigned to store a type of work.

12. The network services processor of claim 1, wherein at least one of the processors performs control plane processing and another one of the processors performs data plane processing.

13. A network services processor comprising:
    a plurality of independent processors, each processor operating in parallel to perform work comprising packet processing operations, each separate packet processing operation defining a piece of work; and
    a packet work order module configured to dynamically schedule work to be performed in parallel by the processors based on a tag associated with each piece of the work, the packet work order module including a group identifier per processor, the group identifier indicating groups of one or more processors that accept work scheduled to that group, the work being performed by the processors being stored in an input queue and the packet work order module differentiating work on the input queue by groups, such that work is scheduled to a processor that accepts work from the group.

14. A network services processor comprising:
    a plurality of independent processors, each processor operating in parallel to perform work comprising packet processing operations, each separate packet processing operation defining a piece of work;
    a packet work order module configured to dynamically schedule work to be performed in parallel by the processors based on a tag associated with each piece of the work; and
    a dedicated tag switch bus coupled between the processors and the packet work order module for transmitting an indication of completion of a tag switch operation by the packet work order module that modifies the tag associated with a piece of work.

15. The network services processor of claim 14, wherein the processors are configured to initiate the tag switch operation by performing a store instruction to set a pending tag switch bit in the processor and, upon detecting the store instruction, the packet work order module is configured to modify the tag and move the work to an in-flight queue associated with the modified tag.

16. A method for processing packets in a network services processor comprising:
    processing work in parallel by a plurality of independent processors, the work comprising packet processing operations, each separate packet processing operation defining a piece of work;
    dynamically scheduling work to be performed in parallel by the processors based on a tag associated with each piece of the work; and
    scheduling work stored on an input queue to one of a plurality of in-flight lists dependent on the tag associated with each piece of the work, each in-flight list associated with a different tag for tracking in-flight work associated with the tag.

17. The method of claim 16, further comprising:
    differentiating work on the input queue by groups, such that work is scheduled to a processor that accepts work from the group, the group identifier indicating groups of one or more processors that accept work scheduled to that group.

18. The method of claim 16, wherein work in the input queue is stored in a packet work order module or in memory external to the packet work order module.

19. The method of claim 16, further comprising:
    controlling, by a timer when work is added to the input queue.

20. The method of claim 16, wherein the work is performing IPsec decryption.

21. The method of claim 16, wherein the work is performing IPsec encryption.

22. The method of claim 16, wherein the work is de-fragmentation of a Virtual Private Network packet.

23. The method of claim 16, wherein the work is adjusting TCP sequence numbers.

24. The method of claim 16, wherein each input queue has an assigned priority.

25. The method of claim 16, wherein each input queue is assigned for storing a type of work.

26. The method of claim 16, wherein at least one of the processors performs control plane processing and another one of the processors performs data plane processing.

27. A method for processing packets in a network services processor comprising:
- processing work in parallel by a plurality of independent processors, the work comprising packet processing operations, each separate packet processing operation defining a piece of work;
- dynamically scheduling work to be performed in parallel by the processors based on a tag associated with each piece of the work; the tag includes including a tag type; and
- scheduling work stored on an input queue to one of a plurality of in-flight lists dependent on the tag associated with each piece of the work, the in-flight list storing work having an atomic tag type that indicates only work at the head of the list is performable by one of the plurality of processors.

28. A method for processing packets in a network services processor comprising:
- processing work in parallel by a plurality of independent processors, the work comprising packet processing operations, each separate packet processing operation defining a piece of work;
- dynamically scheduling work to be performed in parallel by the processors based on a tag associated with each piece of the work; the tag including a tag type; and
- scheduling work stored on an input queue to one of a plurality of in-flight lists dependent on the tag associated with each piece of the work, the in-flight list storing work having an ordered tag type that indicates all work on the list is performable, work being removable only from the head of the list by one of the plurality of processors.

29. A method for processing packets in a network services processor comprising:
- processing work in parallel by a plurality of independent processors, the work comprising packet processing operations, each separate packet processing operation defining a piece of work;
- dynamically scheduling work to be performed in parallel by the processors based on a tag associated with each piece of the work; the tag including a tag type;
- scheduling work stored on an input queue to one of a plurality of in-flight lists dependent on the tag associated with each piece of the work; and
- transmitting an indication of completion of a tag switch operation that modifies the tag associated with a piece of work by the packet work order module over a dedicated tag switch bus coupled between the processors and the packet work order module.

30. The method of claim 29, further comprising:
- initiating a tag switch operation by performing a store instruction to set a pending tag switch bit in the processor; and
- upon detecting the store instruction, modifying the tag and moving the work to an in-flight queue associated with the modified tag.

31. An apparatus for processing packets in a network services processor comprising:
- means for processing work in parallel, the work comprising packet processing operations, each separate packet processing operation defining a piece of work;
- means for dynamically scheduling work to be performed in parallel based on a tag associated with each piece of the work and; and
- means for scheduling work stored on an input queue to one of a plurality of in-flight lists dependent on the tag associated with each piece of the work, each in-flight list associated with a different tag for tracking in-flight work associated with the tag.

* * * * *

UNITED STATES PATENT AND TRADEMARK OFFICE
CERTIFICATE OF CORRECTION

PATENT NO. : 7,895,431 B2
APPLICATION NO. : 11/005490
DATED : February 22, 2011
INVENTOR(S) : Gregg A. Bouchard et al.

Page 1 of 1

It is certified that error appears in the above-identified patent and that said Letters Patent is hereby corrected as shown below:

In Column 21, Claim 27, line 10 delete "includes".

Signed and Sealed this
Twenty-sixth Day of April, 2011

David J. Kappos
*Director of the United States Patent and Trademark Office*